ately Patent Office
3,428,530
Patented Feb. 18, 1969

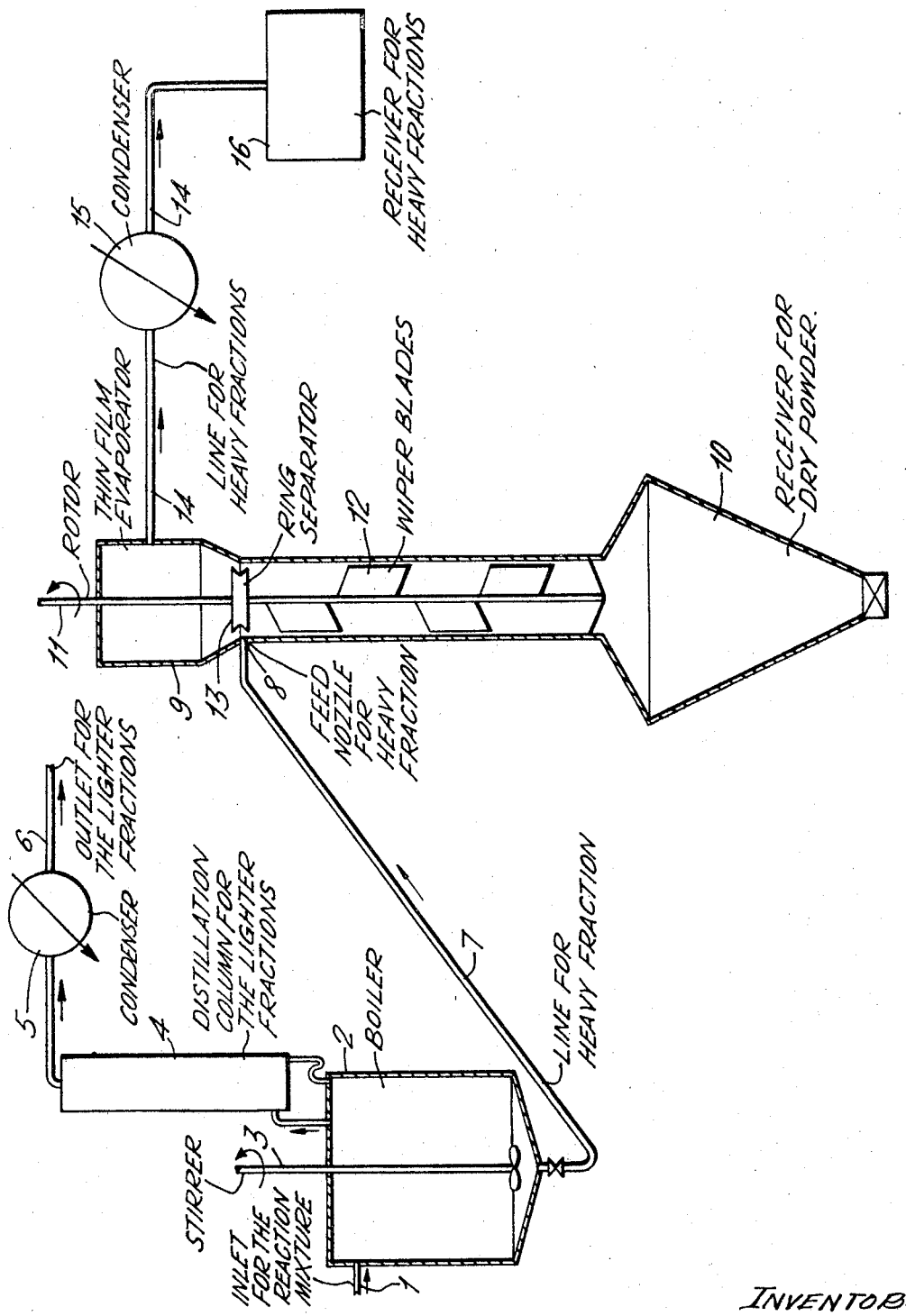

3,428,530
PROCESS FOR THE PURIFICATION OF CHLOROSILANES BY DISTILLATION AND THIN-FILM EVAPORATION
Paul Charles Fauche and Philippe Lacan, Lyon, France, assignors to Rhone-Poulenc S.A.
Filed Sept. 8, 1966, Ser. No. 577,818
Claims priority, application France, Sept. 10, 1965, 31,082
U.S. Cl. 203—72      3 Claims
Int. Cl. B01d *3/14, 3/10;* C07f *7/16*

ABSTRACT OF THE DISCLOSURE

The invention relates to a process for the continuous purification of trichlorosilane, tetrachlorosilane, phenyldichlorosilane, phenyltrichlorosilane, and diphenyldichlorosilane, prepared by reaction of chlorobenzene with silicon, in which the reaction product, containing the chlorosilanes, and solid and tarry material, is condensed to obtain a suspension, the suspension is distilled at 180° C. at at least atmospheric pressure to separate the trichlorosilane and tetrachlorosilane, and the residue is evaporated in a thin film evaporator at a pressure between 2.3 mm. and 22 mm. of Hg, so that the remaining chlorosilanes evaporate, leaving behind the solid and tarry material.

---

This invention relates to chlorosilanes and more specifically to the separation of organochlorosilanes, which are obtained by the reaction of an alkyl or an aryl chloride and silicon.

Several processes have been described for the preparation of alkyl and aryl chlorosilanes. For instance, French Patents 937,823 and 945,013 cover a procedure according to which the alkyl and aryl halides react with silicon, the latter in finely divided form, at high temperature.

The known processes present several difficulties. In general, when an alkyl or an aryl halide is used as the starting material, the reaction mixture contains a complex mixture of impure products and the desired chlorosilanes are contaminated by a variety of solid impurities or tarry materials.

Many suggestions have been made for the purpose of improving the reaction, and specifically with the object, on one hand, of orienting the reaction and increasing the yield of the desired chlorosilanes and on the other hand, with the object of freeing the mixture from the solid and the tarry materials which contaminate the reaction products.

The procedure currently used for the purification of the alkyl and aryl chlorosilanes consists of a continuous fractionation of the crude products obtained by reaction of the alkyl or aryl halides with silicon, with a distillation column. The main disadvantage of this procedure is that, in order to make the fractionation complete, it is necessary to heat the material to a high temperature. This results in the formation of tarry decomposition products, which must be frequently removed.

It has also been proposed to subject the superheated material which emerges from the reaction vessel, to a series of treatments which involve washing in a gas washing bottle, or a lined column which contains a suitable liquid, followed by fractionation of the gaseous products, which emerge from the washing column. This procedure, however, is far from being satisfactory, because the liquid used for the washing, holds not only the solid impurities and the tarry material, but also a certain proportion of the desired products, the chlorosilanes. Manifestly, this procedure presents the problem of periodically necessitating treatment of the liquid used for the washing, which becomes progressively richer of the solid impurities and the tarry material, in order to recover both, the liquid and the chlorosilanes. Another problem is that the chlorosilanes have a great tendency to undergo hydrolysis when exposed to the atmosphere, a fact which gives rise to many additional difficulties, both during the washing operation, as well as during the step of recovery of the chlorosilanes.

In addition to the above, other drawbacks accompany this procedure. The separation of the solid impurities and of the tarry material from the liquid and during the washing operation, may not be achieved by a simple decantation, except in rare instances. Another disadvantage is that, if it is desired to extract the suspension with a solvent, large quantities of the solvents are required and the walls of the apparatus in which the extraction is conducted, become covered with increasing amounts of agglutinates of solid particles, the removal of which constitutes a time-consuming and expensive step.

It has been suggested to solve the above-mentioned problems by filtration of the suspensions. Technical difficulties, however, are involved in the filtration. On one hand, the filtering devices must be air-tight and must be kept under an atmosphere of an inert gas, and on the other hand, the material retained on the filtering device must be washed with substantial amounts of the solvent, For instance, it has been observed that solid particles retained on the filter still contain the chlorosilanes and the solvent, to the extent of 50% of their weight.

Attempts have also been made to subject the supensions to centrifugation. However the solid material which is centrifuged, retains substantial amounts of the liquid, in the range of 40%, and substantial losses of the desired products are involved.

The object of this invention is to provide a process for the isolation of chlorosilanes which permits a more complete separation of the desired organochlorosilanes contained in the crude reaction mixtures and which may be conducted with better yields and in a simpler fashion than the methods known in the art.

These objects are achieved, by condensing the crude mixture obtained from the reaction of alkyl or aryl chlorides and silicon powder, in the presence of catalysts and other additives, and then passing the material, which also contains the solid impurities, continuously, through a thin-film evaporator. The organochlorosilanes may thus be separated in good yield. The operation may be conducted after removal of the forerun by distillation, but this is not necessary.

More specifically, the type of apparatus which is suitable for the process of this invention, is known in the art and has been described in the literature, particularly by Schneider, in Chemie-Ingenieur-Technik, 27, 257 (1955). The apparatus consists of a vertical cylindrical tube, which is provided with a heating jacket. The liquid which must be purified, flows up to the upper section of the cylindrical vessel, and separates on the wall of the apparatus under the action of different devices, for instance, a ring separator. The liquid film, of a thickness generally in the range of a few tenths of a millimeter, evaporates, with the most volatile material reaching the top of the cylindrical tube, while the solid material and the heavier constituents are collected in the lower part of the apparatus. The apparatus is provided with blades hinged onto a central vertical rotor. The blades rotate at high speed, act as wipers and allow the film to spread onto the wall of the evaporator. The net effect of the rotating wipers is to maintain the liquid agitated and to maintain a uniform liquid film on the wall of the tube. Apparatuses of the type described may operate under a good vacuo, for instance in the range of 0.01 mm. of mercury, and over a wide temperature range. Manifestly, the dimensions of the apparatus to be used, vary according to the quantities of the material being treated.

The process for the isolation of the chlorosilanes, in accordance with this invention, essentially consists of two main steps: (1) total condensation of the products which emerge from the vessel after reaction of the chlorinated hydrocarbons and silicon, to give a suspension which is more or less rich of solid particles and tarry material, and (2) continuous evaporation in the apparatus of the type described above. In this manner the organochlorosilanes freed of the solid impurities and tarry material, are isolated, while the impurities are collected at the bottom of the cylindrical vessel in the form of a very mobile powder.

According to a specific embodiment of the invention, after the first step of condensation of the reaction products, it is possible to remove a forerun by distillation, for the purpose of eliminating the most volatile components.

The advantages of the process in accordance with this invention, are substantial. The risk of decomposition of the desired reaction products, by cracking, is minimized, because the entire operation is quickly conducted, and the residence time in the evaporator is very short. Further, the loss of the chlorosilanes in the waste products is very small, and far less than in the processes currently used for the isolation of the chlorosilanes.

Another advantage of the process in accordance with this invention, is that it is not limited to any particular organochlorosilane, but it is applicable to all organochlorosilanes, obtained by the direct reaction of saturated and unsaturated alkyl halides, as well as aryl halides, with silicon. By way of example, the process may be successfully applied to the separation of methyl-, ethyl-, vinyl-, and phenyl chlorosilanes, from the solid impurities present in the reaction mixtures.

The following examples are described in detail below, for the purpose of further illustration of the invention.

EXAMPLE 1

Chlorobenzene and hydrochloric acid are reacted with silicon, in the presence of copper as a catalyst, according to the procedure described in Example 6 of French Patent 945,013. The reaction mixture has the following composition:

|  | Percent |
|---|---|
| Trichlorosilane | 0.14 |
| Tetrachlorosilane | 0.93 |
| Benzene | 11.2 |
| Toluene | 0.12 |
| Chlorobenzene | 39.25 |
| Phenyldichlorosilane | 0.23 |
| Phenyltrichlorosilane | 24.65 |
| Biphenyl | 1.10 |
| Diphenyldichlorosilane | 13.50 |
| Unidentified products | 1.88 |
| Solid residue | 7 |

The above mixture is heated at 180° C., at normal pressure, in order to remove the forerun, which contains the most volatile constituents, that is trichlorosilane, tetrachlorosilane, benzene, toluene, part of the chlorobenzene and phenyltrichlorosilane.

The product which remains after removal of the forerun, is a blackish liquid, containing in suspension 17% of solid matter by weight. By titration, the hydrolyzable chlorine is 27%.

This liquid is introduced by means of a gear pump into the Sambay evaporator of the type described in Chemie-Ingenieur-Technik, loc. cit. at p. 258. The apparatus is made of stainless steel, comprises eight blades acting as wipers, and has the following characteristics:

| | |
|---|---|
| Total height _____meter__ | 1 |
| Height of section being heated _____do____ | 0.575 |
| Inner diameter _____do____ | 0.05 |
| Surface being heated _____square meter__ | 0.075 |
| Rate of rotation of the wipers in number of revolutions per minute _____ | 600–900 |

The apparatus is provided with an external double jacket, and is heated by circulation of steam under a pressure of 22 atmospheres in the jacket.

Four tests are conducted varying the rate of feed of the liquid being treated and the pressure during the operation. The results are tabulated in Table I below, in which A represents the weight of the powder which is recovered and B represents the weight of the purified liquid and C stands for the percentage of dry matter in A, that is the recovered powder. C is determined by washing the powder A with a low-boiling solvent, such as benzene or chlorobenzene, followed by drying 24 hours in an oven at 110° C., and determination of the loss in weight.

TABLE I

| Test No. | I | II | III | IV |
|---|---|---|---|---|
| Heating temperature, °C | 208 | 208 | 208 | 208 |
| Rate of feed per hour, kg./hr | 4.64 | 5.08 | 5.55 | 7.97 |
| Absolute pressure in mm. of mercury | 2.3–2.5 | 10 | 18 | 10 |
| Temperature of the vapors emerging from the evaporator, °C | 95–126 | 122–132 | 135–144 | 131–134 |
| Length of the test, min | 30 | 30 | 30 | 21 |
| A, weight of recovered powder, kg | 0.455 | 0.475 | 0.525 | 0.575 |
| B, weight of the purified liquid, kg | 1.865 | 2.064 | 2.205 | 2.215 |
| Ratio A×100/A+B, percent | 19.6 | 18.7 | 19.3 | 20.6 |
| C, percentage of the dry matter in A, percent | 94 | 88 | 83.5 | 83.5 |

EXAMPLE 2

A crude mixture of chlorosilanes, prepared as described in the preceding experiment, but containing about 15% instead of 17% by weight of solid matter, is subjected to continuous evaporation in a Sambay thin-film evaporator of the following dimensions:

| | |
|---|---|
| Total height _____meters__ | 4.44 |
| Height of section being heated _____do____ | 2.11 |
| Inner diameter _____do____ | 0.30 |
| Surface being heated _____square meters__ | 2 |
| Rate of rotation of the wipers in number of revolutions per minute _____ | 120 |
| Nine rows of rotating wipers, each of length meters__ | 0.30 |

The apparatus is heated by circulation of oil in the outer jacket.

Two tests are conducted and allowed to proceed over a longer period of time than in the preceding example.

The data are tabulated in Table II below, in which A, B and C have the same meaning as above.

TABLE II

| Test No. | I | II |
|---|---|---|
| Heating temperature, °C | 280 | 280 |
| Rate of feed per hour, kg./hr | 167.8 | 150 |
| Absolute pressure in mm. of mercury | 10–16 | 10–16 |
| Temperature of the vapors emerging from the evaporator, °C | 200 | 200 |
| Length of the test, hr | 100 | 64 |
| A, weight of recovered powder, kg | 2,670 | 1,560 |
| B, weight of the purified liquid, kg | 14,110 | 8,040 |
| Ratio A×100/A+B, percent | 15.9 | 16.2 |
| C, percentage of the dry matter in A, percent | 94 | 92 |

EXAMPLE 3

Methyl chloride is reacted with a silicon-copper alloy, according to the procedure described in Example 14 of French Patent 937,823. The reaction mixture has the following composition:

| | Percent |
|---|---|
| low boiling material | 2 |
| methyldichlorosilane | 5 |
| trimethylchlorosilane | 6 |
| methyltrichlorosilane | 14 |
| dimethyldichlorosilane | 65 |
| methylchlorodisilanes (mixture of products of general formula $(CH_3)_{6-n}Cl_nSi_2$, in which $n$ varies between 0 and 6) | 7 |
| solid product | 1 |

The mixture is heated up to 180° C. at a pressure of 2 bars, in order to remove the forerun. The remaining brownish liquid contains 16.5% by weight of solid matter. It is subjected to evaporation in the Sambay thin-film evaporator as described in Example 1. The results of the test are tabulated in Table III below.

TABLE III

| | |
|---|---|
| Heating temperature | 200° C. |
| Rate of feed per hour | 4.31 kg. |
| Absolute pressure in mm. of mercury | 15–22. |
| Temperature of the vapors emerging from the evaporator | 120° C. |
| Length of the test | 4 hrs. 30 minutes. |
| A, weight of recovered powder | 3.48 kg. |
| B, weight of the purified liquid | 15.905 kg. |
| Ratio $A \times 100/A+B$ | 18%. |
| C, percentage of the dry matter in A | 92. |

A suitable apparatus for carrying out the process of the invention is shown schematically in the drawing. In the drawing, the reaction mixture is fed through a line 1 to a distillation apparatus consisting of a boiler 2, the contents of which are agitated by a stirrer 3, and a distillation column 4. The lighter fractions, containing trichlorosilane, and tetrachlorosilane, leaving the distillation are condensed in a condenser 5 and leave the apparatus by an outlet 6. The heavy fractions, containing phenyldichlorosilane, phenyltrichlorosilane and diphenyldichlorosilane, leave the boiler by a line 7 and enter, by a nozzle 8, a thin-film evaporator 9 having a receiver 10 for the dry powder deriving from the evaporation. The evaporator has a rotor 11, mounted vertically in the evaporator, and having mounted thereon wiper blades 12 and a ring separator 13. The evaporated heavy fractions, containing phenyldichlorosilane, phenyltrichlorosilane and diphenyldichlorosilane, leave the evaporator by a line 14 and are condensed in a condenser 15 before entering a receiver 16.

The results of the tests described herein undisputably demonstrate the superiority of the process in accordance with this invention. The process may be conducted continuously over a wide range of temperature and pressure, and it is not necessary to interrupt the operation to remove the tarry reaction products. The operation may be conducted with complete recovery of the liquid material, and very little loss of the liquid material being held in the solid portion at the bottom of the apparatus. Another advantage of the process in accordance with this invention, is that hydrolysis of the organochlorosilanes is avoided. The process may be conducted very efficiently, and with high rate of feed. Those skilled in the art will readily appreciate that several modifications of the specific examples described herein are possible without departing from the spirit of the invention, which is to be limited only by the scope of the appended claims.

We claim:

1. In the continuous purification of trichlorosilane, tetrachlorosilane, phenyldichlorosilane, phenyltrichlorosilane, and diphenyldichlorosilane prepared by reaction of chlorobenzene with silicon, wherein a mixture comprising said chlorosilanes and solid material and tarry material is obtained, the improvement which comprises condensing said mixture to obtain a suspension, heating and distilling the said suspension at a pressure of at least atmospheric whereby trichlorosilane and tetrachlorosilane are distilled off, as a top product, introducing the suspension remaining as a bottom of said distillation into an evaporating zone, and evaporating the suspension at a pressure between 2.3 mm. and 22 mm. of Hg, with the temperature of the vapors at the exit of said evaporating zone between 95° and 200° C., while subjecting said suspension to agitation and to a wiping action, whereby a thin liquid film is controllably maintained on the inner lateral wall of said zone, the major part of the liquid flows upwards therein, evaporates and is collected at the upper end thereof, and the heavier constituents of said liquid together with solid and tarry material deposit at the lower end thereof.

2. The process according to claim 1 wherein said suspension is distilled at atmospheric pressure, and the evaporation is effected at a pressure between 2.3 mm. and 16 mm. Hg.

3. The process according to claim 1 wherein said suspension is distilled at 180° C. under a pressure of at least two atmospheres to remove lower boiling constituents, and the suspension remaining is evaporated by heating at a pressure of at least 15 mm. of mercury, with the temperature of the vapors at the exit of said evaporating zone being at least 120° C.

References Cited

UNITED STATES PATENTS

| 2,755,295 | 7/1956 | Gordon | 260—448.2 |
| 2,766,193 | 10/1956 | Schneider | 202—236 |
| 2,890,155 | 6/1959 | Bueche | 203—89 |
| 2,895,886 | 7/1959 | Schneider | 203—72 |
| 2,934,549 | 4/1960 | Tarrant et al. | 260—448.2 |
| 3,054,444 | 9/1962 | Robbins | 203—89 |
| 3,092,587 | 6/1963 | Ester et al. | 203—72 |
| 3,099,670 | 7/1963 | Prober | 260—448.2 |

FOREIGN PATENTS

| 144,501 | 3/1962 | U.S.S.R. |
| 900,457 | 7/1962 | Great Britain. |

WILBUR L. BASCOMB, JR., *Primary Examiner.*

U.S. Cl. X.R.

202—236; 203—73, 80, 89, 91; 260—448.2